Patented Feb. 9, 1932

1,844,163

UNITED STATES PATENT OFFICE

EDUARD HOLZAPFEL, OTTO BRAUNSDORF, AND HANS LANGE, OF HOCHST-ON-THE-MAIN, GERMANY, ASSIGNORS TO GENERAL ANILINE WORKS, INC., OF NEW YORK, N. Y., A CORPORATION OF DELAWARE

DERIVATIVES OF THE BENZANTHRONE SERIES AND PROCESS OF PREPARING THEM

No Drawing. Application filed July 27, 1927, Serial No. 208,894, and in Germany August 2, 1926.

Our present invention relates to the manufacture of derivatives of the benzanthrone series.

We have found that benzanthronyl sulfides of the general formula:

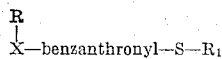

wherein X represents $NH$, $O$, $NH.CO$- or $S$; R represents H, alkyl, aryl, aralkyl and $R_1$ alkyl, aryl and aralkyl (the term aryl also comprising the anthraquinonyl and benzanthronyl residue, substituted or not) are obtained by subjecting a mono- or poly-halogen-substituted benzanthronyl sulfide to reaction with a compound containing an exchangeable hydrogen atom, as for instance ammonia, aliphatic or aromatic amines, acid amides, phenols or mercaptans with splitting off of hydrogen halide. If the reaction is conducted under suitable conditions, there may also be used as starting material the halogen-substituted benzanthronyl mercaptans or benzanthronyl-disulfides, because during the condensation process sulfur or hydrogen sulfide is simultaneously split off and thus the corresponding condensation products of the benzanthronyl sulfides are formed. If this splitting off of sulfur does not occur, there are obtained condensation products of the benzanthronyl mercaptans and benzanthronyl disulfides.

In the same manner condensation products of other sulfur-containing benzanthrone derivatives may also be prepared, for instance those of the benzanthronyl thioglycollic acid by causing their halogen substitution products to react with ammonia, aliphatic or aromatic amines, acid amides, phenols or mercaptans.

Another process for preparing products of the above indicated formula: $R.NH$-benzanthrone-$S$-$R_1$ consists in starting from amino-substituted products of the mercaptans or disulfides or sulfides of benzanthronyl or derivatives thereof and condensing them under appropriate conditions with compounds containing a replaceable halogen.

Instead of subjecting halogenated benzanthronyl sulfides, benzanthronyl mercaptans and benzanthronyl disulfides to reaction with ammonia so as to form amino compounds of the said sulfur-containing benzanthrone derivatives, another procedure may also advantageously be followed. For we have furthermore found that amino compounds are likewise obtained by causing hydroxylamine in a sulfuric acid solution, if required with addition of metal compounds promoting the reaction, to act upon benzanthronyl sulfides, benzanthronyl disulfides, or benzanthronyl mercaptans, or derivatives thereof.

The following examples serve to illustrate our invention, but they are not intended to limit it thereto; the parts are parts by weight:

(1) 50 parts of mono-bromo-benzanthronyl sulfide—obtained by brominating Bz1, Bz1'-benzanthronyl sulfide in concentrated sulfuric acid—are heated in an autoclave provided with a stirrer for about 20 hours to 170° C. to 180° C. with 250 parts of concentrated aqueous ammonia and 30 to 40 parts of copper sulfate. The mono-amino-benzanthronyl sulfide, after being freed from the copper salts by means of boiling water, forms a brown powder which dissolves in concentrated sulfuric acid to a bluish-green solution. By recrystallizing it from high-boiling organic solvents, for instance nitrobenzene, it may be further purified. It melts only at a temperature above 340° C. Under the same conditions dibromo-Bz1, Bz1'-benzanthronyl sulfide (obtainable by brominating Bz1, Bz1'-benzanthronyl sulfide in chlorosulfonic acid) yields diamino-Bz1, Bz1'-benzanthronyl sulfide which is a dark reddish-brown powder dissolving in concentrated sulfuric acid to a green solution.

(2) By heating 1 part of monobromo-Bz1-benzanthronyl-methyl sulfide together with about 10 times its weight of concentrated aqueous ammonia, some copper sulfate and ammonium chloride in a pressure vessel to 170° C. to 180° C., a monoamino-Bz1-benzanthronyl methyl sulfide is obtained which crystallizes from chlorobenzene in the form of small dark-red crystals having a melting point of between 275° C. and 278° C. and dissolves in concentrated sulfuric acid to a greenish-blue solution.

The monobromo-Bz1-benzanthronyl methyl sulfide used as starting material may be prepared by causing bromine to act upon Bz1-benzanthronyl methyl sulfide in nitrobenzene; it melts at 238° C. to 240° C.

(3) 10 parts of monobromo benzanthronyl sulfide are heated in a pressure vessel for 10 to 12 hours to 170° C. to 180° C. together with 20 parts of propylamine while adding 0.1 part of copper powder and 2 to 3 parts of potassium acetate. The reaction product, after being cooled and purified by extracting it with a boiling dilute acid and washing with water, forms a reddish-brown powder dissolving in concentrated sulfuric acid to a bluish-green solution and must be regarded, according to the results of its analysis, as being propyl amino benzanthronyl-sulfide.

(4) 30 parts of dibromo-benzanthronyl sulfide—produced by brominating Bz1-Bz1'-benzanthronyl sulfide in chlorosulfonic acid—are heated to boiling with 300 parts of anhydrous aniline, 6 parts of calcined sodium carbonate, 6 parts of anhydrous sodium acetate and 2 parts of cuprous chloride until no more unaltered dibromo-benzanthronyl sulfide can be detected. The condensation product, when isolated in the usual manner, forms a yellowish-brown powder which dissolves in concentrated sulfuric acid to a green solution.

(5) 20 parts of mono-bromo-benzanthronyl sulfide—obtained in the way indicated in Example 1—are heated to boiling with 10 parts of benzamide, 10 parts of calcined sodium carbonate and 0.5 parts of copper powder in 300 parts of nitrobenzene until there can no longer be detected any unaltered starting material. The condensation product, when isolated in the usual manner, forms a brown powder. Its solution in concentrated sulfuric acid is of a green color.

(6) 100 parts of mono-bromo-benzanthronyl sulfide—obtained as set forth in Example 1—are heated to boiling for about 14 hours with 75 parts of α-amino anthraquinone, 25 parts of calcined sodium carbonate and 1 part of copper powder in 1500 parts of nitrobenzene. The resulting condensation product is filtered off and freed from nitrobenzene and inorganic salts by washing with ethyl alcohol and a stream of water. The product forms a brownish-red powder which dissolves in concentrated sulfuric acid to an emerald-green solution. It yields a reddish-brown vat which dyes cotton a faint reddish-brown tint. By fractional precipitation from concentrated sulfuric acid the product may be easily obtained in a still purer state.

(7) By condensing dibromo-benzanthronyl sulfide,—as it is obtainable by brominating Bz1-Bz1'-benzanthronyl sulfide in concentrated sulfuric acid—with α-amino anthraquinone according to the indications contained in Example 4, the di-α-anthraquinonyl-amino-benzanthronyl sulfide is obtained as a reddish-brown powder. It dissolves in concentrated sulfuric acid to a pure green solution and dyes cotton from a reddish-brown hydrosulfite vat a faint reddish-brown tint.

(8) 43.3 parts of bromo-Bz1-benzanthronyl-para-cresyl-thioether (obtainable by causing dibromo benzanthrone to react with para-thiocresol), 30 parts of α-amino anthraquinone, 15 parts of sodium acetate, 3 parts of calcined sodium carbonate, 0.5 parts of copper powder and 1 part of cuprous chloride are introduced, while stirring, into 1200 parts of nitrobenzene, and the whole is heated to boiling for about 12 hours. After cooling, the mass is filtered by suction, the nitrobenzene is removed by washing with alcohol and the salts by washing with water. The α-anthraquinonylamino-Bz1-benzanthronyl-para-cresylthioether remains in the form of a brownish violet crystalline powder melting at about 330° C. and dissolving in concentrated sulfuric acid to a green solution.

(9) 10 parts of dibromo-benzanthronyl sulfide—obtained by subjecting dibromo benzanthrone to reaction with sodium disulfide—are heated to boiling with 80 to 100 parts of phenol and 3 to 5 parts of anhydrous potassium carbonate until no more unattached dibromo-benzanthronyl sulfide can be detected. The condensation product, after being isolated from the melt and freed from phenol by boiling with diluted caustic soda solution, forms a brown powder which dissolves in concentrated sulfuric acid to a green solution.

(10) By substituting in the preceding example for the phenol the corresponding quantity of para-thiocresol, a di-para-thiocresoxy benzanthronyl sulfide is obtained in the form of a light-brown powder dissolving in concentrated sulfuric acid to a green solution.

(11) 18 parts of monobromo-Bz1-benzanthronyl methyl sulfide are heated for about 12 hours to 171° C. to 175° C. in 180 parts of phenol together with 8 parts of anhydrous potassium carbonate in the presence of a small quantity of copper carbonate. The Phenoxy-Bz1-benzanthronyl methyl sulfide thus produced is freed from the excess of phenol by extracting it with a boiling dilute caustic soda-solution. It is left in the form of a brownish-red powder which can be easily purified by recrystallizing it from a mixture of chlorobenzene and ethyl alcohol; it is thus obtained in the form of small orange-colored crystalline laminæ, melting at 163° C. to 165° C. It is soluble in concentrated sulfuric acid to a pure green solution.

(12) 100 parts of dibromo-Bz1-Bz1'-benzanthronyl-disulfide—produced by brominating Bz1-Bz1'-benzanthronyl disulfide in chlorosulfonic acid are heated to boiling for about 20 hours with 100 parts of α-amino anthraquinone, 30 parts of calcined sodium carbonate and 2 parts of copper powder in 2000 parts of nitrobenzene. The condensation product is filtered off and washed with ethyl alcohol and water. The resulting product is a di-α-anthraquinonyl-amino-Bz1-Bz1'-benzanthronyl sulfide forming a reddish-brown powder. It dissolves in concentrated sulfuric acid to a pure green solution and dyes cotton from a reddish-brown hydrosulfite vat faint reddish-brown tints.

(13) 150 parts of monoamino-Bz1-Bz1'-benzanthronyl sulfide (see Example 1) are heated to boiling with 90 parts of α-chloro anthraquinone, 25 parts of calcined sodium carbonate, 25 parts of anhydrous sodium acetate and 1 part of copper powder in 2500 parts of nitrobenzene until no more unattacked starting material can be detected. The condensation product, after being isolated in the usual manner, forms a brownish-red powder which dissolves in concentrated sulfuric acid to a green solution.

(14) 50 parts of diamino-Bz1-Bz1'-benzanthronyl sulfide, obtainable by melting nitro-Bz1-bromobenzanthrone with sodium disulfide, are heated for about 24 hours to 180° C. to 190° C., while stirring, with 60 parts of α-chloro anthraquinone, 40 parts of anhydrous potassium carbonate while adding a small quantity of copper chloride and copper in 500 parts of nitrobenzene. After cooling, the whole is filtered, then freed from the organic solvent by washing with alcohol and from the inorganic salts by washing with water. The condensation product is a dianthraquinonyldiamino-Bz1-Bz1'-benzanthronyl sulfide and forms a reddish-brown powder dissolving in concentrated sulfuric acid to a green solution.

(15) 52 parts of 6.6'-diamino-Bz1-Bz1'-benzanthronyl sulfide are heated for 40 hours to 200° C. in 1200 parts of naphthalene together with 40 parts of chloranil, 30 parts of potassium carbonate and 0.75 parts of copper powder. The condensation product constitutes a dark-brown powder dissolving in concentrated sulfuric acid to a bluish-green solution.

(16) Into a solution of 100 parts of benzanthronyl sulfide in 2000 parts of sulfuric acid of 66° Bé. are successively introduced at ordinary temperature, 80 parts of ferrous sulfate and 80 parts of hydroxylamine sulfate. The mixture so obtained, is gradually heated to 125° C. to 130° C. and stirred until the reaction is complete. The reaction product is isolated as usual and then forms a reddish-brown powder dissolving in concentrated sulfuric acid to a bluish-green solution; it is, as its analysis shows, a monoamino benzanthronyl sulfide.

(17) 10 parts of monobromo benzanthronyl sulfide (obtainable for instance by treating benzanthronyl sulfide with bromine in concentrated sulfuric acid) are dissolved at ordinary temperature in 200 parts of sulfuric acid of 66° Bé. To this solution are added 7 parts of copper sulfate and 9 parts of hydroxylamine sulfate and the whole is stirred, for 6 to 8 hours at 130° C. to 135° C. The product after being cooled, poured on ice, filtered by suction and washed, forms a reddish-brown powder dissolving in concentrated sulfuric acid to a green solution. Analysis shows that it is a monobromo-monoamino-benzanthronyl sulfide.

(18) A diamino benzanthronyl sulfide is produced by causing hydroxylamine to act under more energetic conditions upon benzanthronyl sulfide. 10 parts of benzanthronyl sulfide are introduced, while stirring, into 200 parts of sulfuric acid of 95 per cent. strength; to this mixture are successively added 4 parts of water, 10 parts of ferrous sulfate and 14 parts of hydroxylamine sulfate, and the whole is heated for about 8 hours to 140° C. to 150° C. The reaction product is isolated as usual and constitutes, as analysis shows, a diamino benzanthronyl sulfide. It is a reddish-brown powder dissolving in concentrated sulfuric acid to a green solution.

(19) 1 part of benzanthronyl disulfide is introduced at ordinary temperature, while stirring, into 20 parts of sulfuric acid of 95 per cent. strength. To this mixture are added 1 part of crystallized ferrous sulfate and 1 part of hydroxylamine sulfate, and the whole is slowly heated to 120° C. to 130° C. and kept at this temperature for several hours. After cooling, the product is poured on ice, the brown precipitate is filtered by suction and washed with water. The product of the reaction is a brown powder which dissolves in concentrated sulfuric acid to a reddish-violet solution. Analysis shows that it is a monoamino benzanthronyl disulfide.

In the following tables there are represented graphically the starting materials, auxiliary reagents and products described in the foregoing examples:

| Ex. Nos. | Starting reactants | Reacted with | Final products |
|---|---|---|---|
| 1. | [structure]—Br | $NH_3$ | [structure]—$NH_2$ |
| 2. | Br—[structure] | $NH_3$ | $NH_2$—[structure] |
| 3. | [structure]—Br | $CH_3-CH_2-CH_2-NH_2$ | [structure]—$NH-CH_2-CH_2CH_3$ |
| 4. | [structure]—Br, Br | $C_6H_5-NH_2$ | [structure]—$NH-C_6H_5$, $NH-C_6H_5$ |
| 5. | [structure]—Br | $C_6H_5CO-NH_2$ | [structure]—$NH-CO-C_6H_5$ |
| 6. | [structure]—Br | [aminoanthraquinone] | [structure]—$NH$-[anthraquinone] |
| 7. | [structure]—Br, Br | [aminoanthraquinone] | [structure with two NH-anthraquinone] |
| 8. | Br—[structure]—$S.C_6H_4CH_3$ | [aminoanthraquinone] | [anthraquinone]—$NH$—[structure]—$S.C_6H_4.CH_3$ |
| 9. | Br—[structure]—Br | $C_6H_5-OH$ | $C_6H_5O$—[structure]—$O-C_6H_5$ |
| 10. | Br—[structure]—Br | $CH_3$-SH | $CH_3$-S—[structure]—S-$CH_3$ |
| 11. | Br—[structure]—$S-CH_3$ | $C_6H_5OH$ | $C_6H_5O$—[structure]—$SCH_3$ |

| Ex. Nos. | Starting reactants | Reacted with | Final products | |
|---|---|---|---|---|
| 12. | 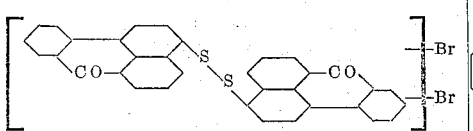 | 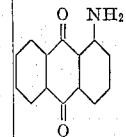 | 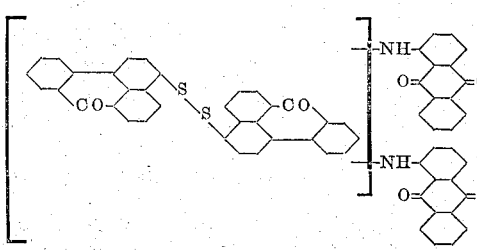 | |
| 13. |  | 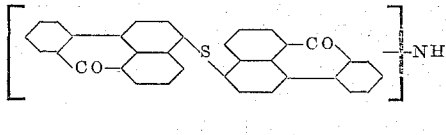 | 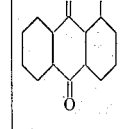 | |
| 14. | 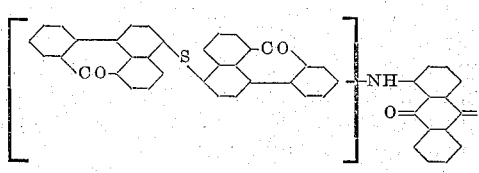 | 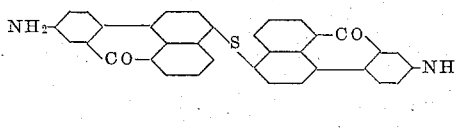 | 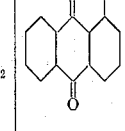 | |
| 15. | 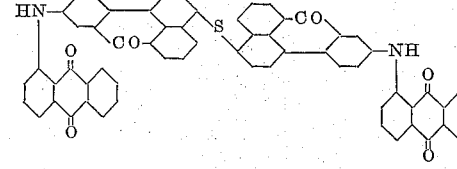 | 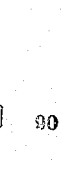 | probably 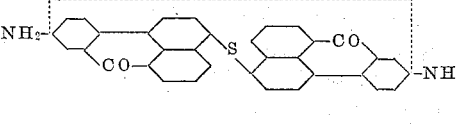 | |
| 16. | 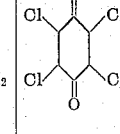 | NH$_2$—OH | 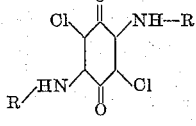 | |
| 17. | 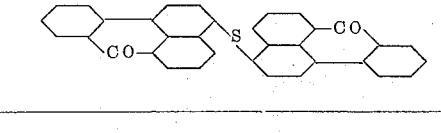 | NH$_2$—OH | 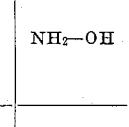 | |
| 18. | 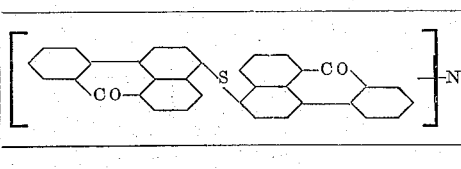 | NH$_2$—OH | 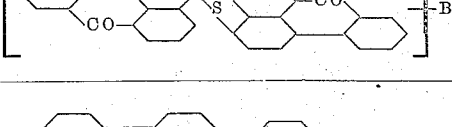 | |
| 19. | 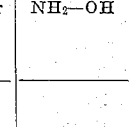 | NH$_2$—OH | 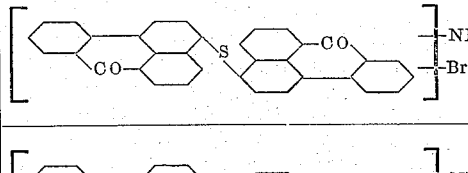 | |

By "aromatic radical" in the appended claims we mean to include substituted and unsubstituted aryl, aroyl and anthraquinonyl groups.

In the following claims the benzanthrone compounds named as starting materials are intended to comprise also derivatives thereof.

This application contains subject matter in common with our application Ser. No. 96,871, filed March 23, 1926.

We claim:

1. The process of preparing benzanthrone derivatives which consists in causing compounds containing an exchangeable hydrogen atom which may belong to the group consisting of ammonia, aliphatic or aromatic amines, acid amides, phenols or mercaptans to act upon benzanthrones of the following formula:

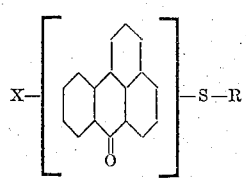

wherein X stands for one or several halogen atoms, and R stands for alkyl, aryl or aralkyl.

2. The process of preparing benzanthrone derivatives which consists in causing a compound of the following formula: $NH_2R_1$, wherein $R_1$ stands for hydrogen or the α-anthraquinonyl group to act upon benzanthrones of the following formula:

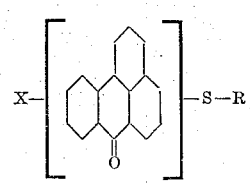

wherein X stands for one or several halogen atoms, and R stands for alkyl, aryl or aralkyl.

3. The process of preparing benzanthrone derivatives which consists in causing α-amino anthraquinone to act upon benzanthrones of the following formula:

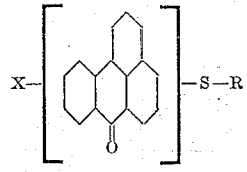

wherein X stands for one of several halogen atoms, and R stands for alkyl, aryl or aralkyl.

4. The process of preparing benzanthrone derivatives which consists in causing compounds containing an exchangeable hydrogen atom which may belong to the group consisting of ammonia, aliphatic or aromatic amines, acid amides, phenols or mercaptans to act upon benzanthrones of the following formula:

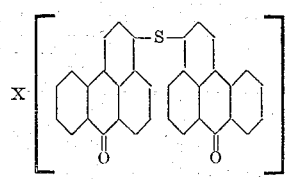

wherein X stands for one or several halogen atoms.

5. The process of preparing benzanthrone derivatives which consists in causing a compound of the following formula: $NH_2R_1$ wherein $R_1$ stands for hydrogen or the α-anthraquinonyl group to act upon benzanthrones of the following formula:

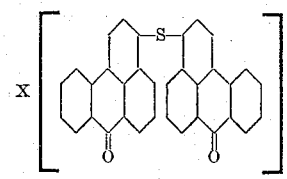

wherein X stands for one or several halogen atoms.

6. The process of preparing benzanthrone derivatives which consists in causing α-amino anthraquinone to act upon benzanthrones of the following formula:

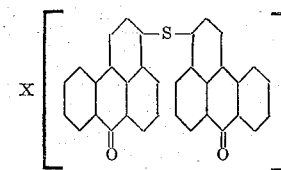

wherein X stands for one or several halogen atoms.

7. The process of preparing benzanthrone derivatives which consists in causing compounds containing an exchangeable hydrogen atom which may belong to the group consisting of ammonia, aliphatic or aromatic amines, acid amides, phenols or mercaptans to act upon benzanthrones of the following formula:

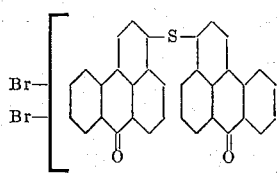

8. The process of preparing benzanthrone derivatives which consists in causing a compound of the following formula: $NH_2R_1$ wherein $R_1$ stands for hydrogen or the α-anthraquinonyl group to act upon benzanthrones of the following formula:

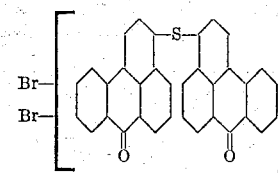

9. The process of preparing benzanthrone derivatives which consists in causing α-amino anthraquinone to act upon benzanthrones of the following formula:

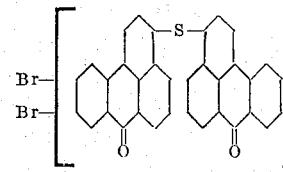

10. As a new product the compound of the following formula:

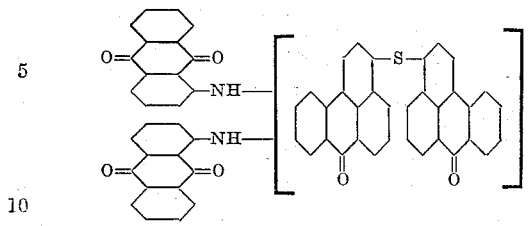

forming a reddish-brown powder.

11. As new products compounds of the following general formula:

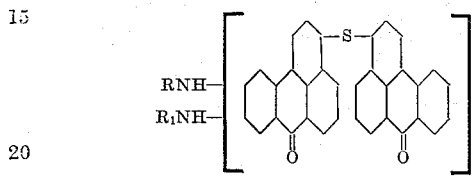

wherein R and $R_1$ each represent an aromatic radical.

12. As new products, the compounds of the following general formula:

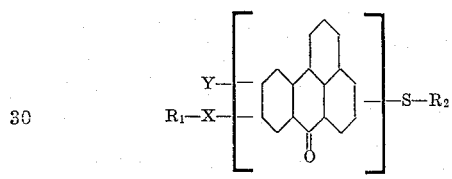

wherein Y stands for hydrogen or $R_1$—X—, X stands for —NH—, —O—, NH.CO— or —S—, $R_1$ stands for alkyl, aryl or aralkyl, and $R_2$ for alkyl, aryl and aralkyl or the group:

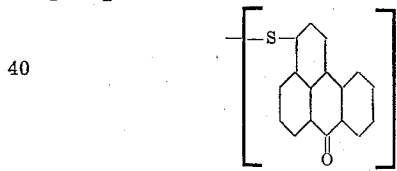

13. As new products, the compounds of the following formula:

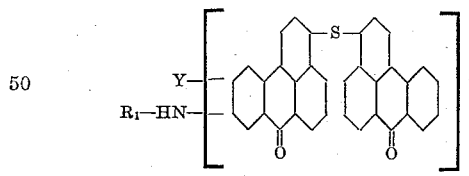

wherein Y stands for hydrogen or $R_1$—NH— and $R_1$ stands for alkyl, aryl —CO. aryl or aralkyl.

14. As new products, the compounds of the following formula:

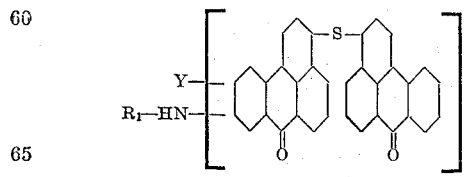

wherein Y stands for hydrogen or $R_1$—NH— and $R_1$ stands for an aromatic radical.

15. As a new product the compound of the following probable formula:

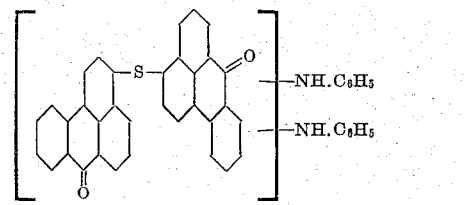

forming a yellowish brown powder.

16. As a new product the compound of the following probable formula:

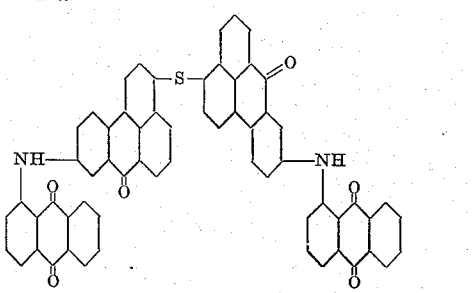

forming a reddish brown powder.

In testimony whereof, we affix our signatures.

EDUARD HOLZAPFEL.
OTTO BRAUNSDORF.
HANS LANGE.